(12) United States Patent
Chen

(10) Patent No.: US 11,686,399 B1
(45) Date of Patent: Jun. 27, 2023

(54) WATER VALVE

(71) Applicant: SHIN TAI SPURT WATER OF THE GARDEN TOOLS CO., LTD, Chang-Hua Hsien (TW)

(72) Inventor: Chin-Yuan Chen, Chang-Hua Hsien (TW)

(73) Assignee: SHIN TAI SPURT WATER OF THE GARDEN TOOLS CO., LTD., Changhua County (TW)

( * ) Notice: Subject to any disclaimer, the term of this patent is extended or adjusted under 35 U.S.C. 154(b) by 0 days.

(21) Appl. No.: 17/746,666

(22) Filed: May 17, 2022

(51) Int. Cl.
| F16K 11/20 | (2006.01) |
| F16K 11/10 | (2006.01) |
| F16K 11/22 | (2006.01) |

(52) U.S. Cl.
CPC ............ *F16K 11/20* (2013.01); *F16K 11/105* (2013.01); *F16K 11/22* (2013.01); *Y10T 137/87877* (2015.04)

(58) Field of Classification Search
CPC .................... Y10T 137/87877; F16K 11/22
See application file for complete search history.

(56) References Cited

U.S. PATENT DOCUMENTS

| 3,840,048 | A | * | 10/1974 | Moen | F16K 11/085 |
| | | | | | 251/363 |
| 7,216,672 | B1 | * | 5/2007 | Chen | F16L 41/16 |
| | | | | | 251/149.8 |
| D749,701 | S | * | 2/2016 | Lo | D23/245 |
| D829,572 | S | * | 10/2018 | Cheng | D23/245 |
| D837,664 | S | * | 1/2019 | Cheng | D23/245 |
| 11,118,696 | B2 | * | 9/2021 | Ye | F16K 11/22 |
| 2014/0299213 | A1 | * | 10/2014 | Cheng | F16K 11/24 |
| | | | | | 137/883 |
| 2019/0032812 | A1 | * | 1/2019 | Lo | F16K 11/20 |
| 2021/0332896 | A1 | * | 10/2021 | Chen | F16K 5/0414 |
| 2021/0341063 | A1 | * | 11/2021 | Chen | F16K 27/065 |

* cited by examiner

*Primary Examiner* — Robert K Arundale

(57) ABSTRACT

A water valve has a main body and at least two control valve sets. The main body has an upper cover and a base, the upper cover and the base correspondingly form an enclosed space and are locked with screws. The main body further has an input portion, two controlling portions and a containing chamber. The input portion connects to a water source, each controlling portion has a controlling chamber located in the main body and an outputting space. Each controlling chamber has a through aperture on a side connected to the containing chamber. Each of the control valve sets has a control valve with a knob, the knob has an extending valve tube configured to sleeve onto the controlling chamber of the controlling portion, and the knob is exposed from the main body; each valve tube further has a through hole capable of being aligned with the through aperture.

10 Claims, 11 Drawing Sheets

A-A

WATER VALVE

BACKGROUND OF INVENTION

Field of Invention

The present invention relates to a water valve, and more particularly to a water valve can be have different upper covers with different materials, patterns or colors.

Description of the Related Art

In order to avoid plants drying up and dying due to lack of water, watering routine is a very frequent and important gardening work. Usually the plants are planted in a wide range or a certain distance from the water source, therefore, the water hose extension is employed and connected to the water via a connector, then the water hose is connected to the sprinkler device. However, it is impossible to achieve the effect of diverting and separately controlling the opening and closing for multiple water hose or sprinkler device. Therefore, when there are many places that need to be watered, it is necessary to find more water sources or to water different places alternatively, which is not convenient in use.

However, the above-mentioned conventional structure still has the following problems in practical application: the gardening water spray tool as a whole has the same color or has the same surface texture, which is extremely monotonous and is relatively unlikable. Also, each water pipe can only provide one gardening water spraying tool for connection, but cannot be divided. Therefore, when multiple gardening watering tools are needed in the same field, it is necessary to pull out multiple watering pipes from the water source, which is quite inconvenient and it is also easy to cause confusion in the configuration of the pipeline. Furthermore, water pipes do not have the water control function, so in order to turn on or off the water or change the flow rate of the water, it can only be done at the water source which is time-consuming and labor-intensive.

Therefore, it is desirable to provide a water valve and its cover to mitigate and/or obviate the aforementioned problems.

SUMMARY OF THE INVENTION

An objective of present invention is to provide water valve which is capable of improving the above-mention problems.

In order to achieve the above mentioned objective, A water valve has a main body and at least two control valve sets. The main body has an upper cover and a base, the upper cover and the base correspondingly form an enclosed space and are locked with screws. The main body further has an input portion, two controlling portions and a containing chamber. The input portion is configured for connection to a water source, each controlling portion has a controlling chamber located in the main body and an outputting space. Each controlling chamber has a through aperture on a side connected to the containing chamber. Each of the control valve sets has a control valve with a knob, the knob has an extending valve tube configured to sleeve onto the controlling chamber of the controlling portion, and the knob is exposed from the main body; each valve tube further has a through hole capable of being aligned with the through aperture.

Other objects, advantages, and novel features of invention will become more apparent from the following detailed description when taken in conjunction with the accompanying drawings.

DETAILED DESCRIPTION OF THE PREFERRED EMBODIMENT

Figure 1:
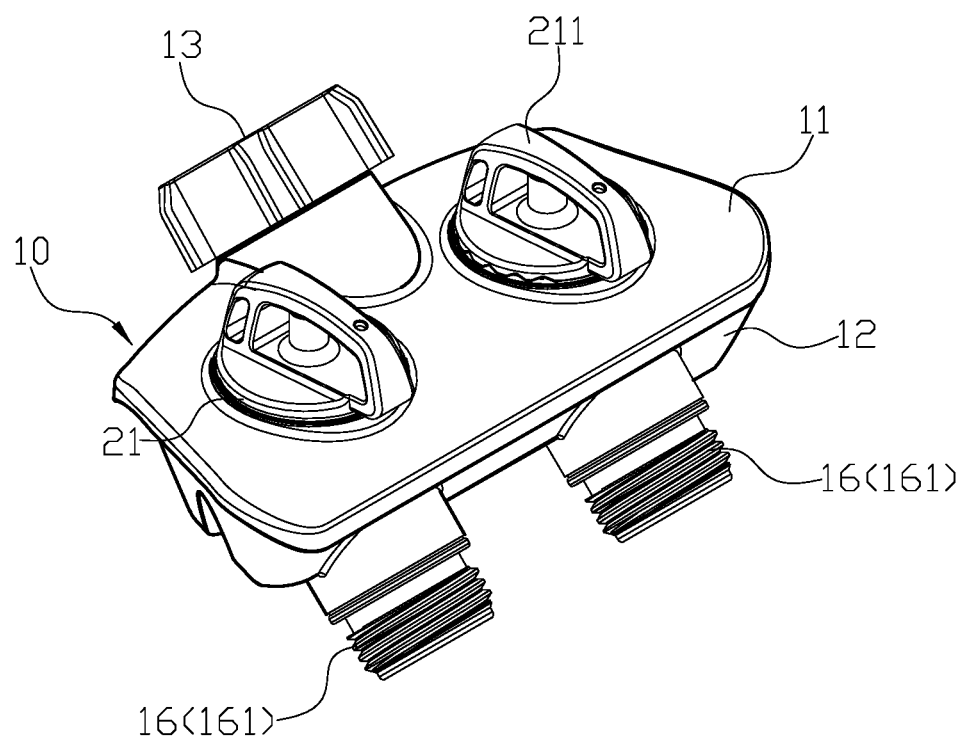
FIG. 1 is a three-dimensional combined drawing of a preferred embodiment of the present invention.
Figure 2:
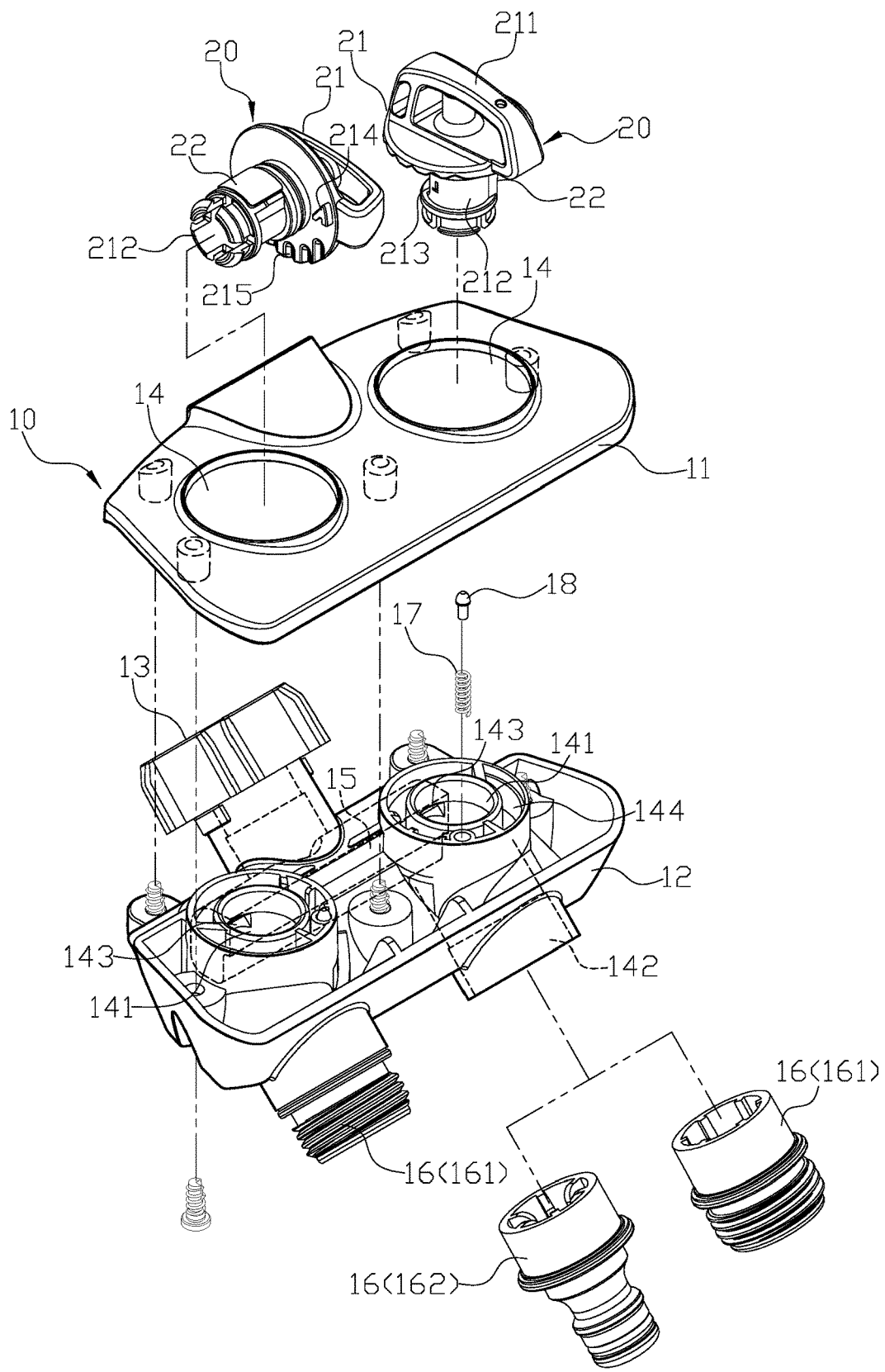
FIG. 2 is a three-dimensional exploded view of the preferred embodiment of the present invention.

First, please refer to FIG. 1 to FIG. 7. A water valve comprising: a main body 10 and at least two control valve sets 20. The main body 10 has an upper cover 11 and a base 12, and the upper cover 11 and the base 12 correspondingly form an enclosed space and are locked with screws, which allows the main body 10 to be covered by the upper cover 11 with different materials, surface patterns or colors. The main body 10 further has an input portion 13, at least two controlling portions 14 and a containing chamber 15. The input portion 13 is configured for connection to a water source, and each s controlling portion 14 has a controlling chamber 141 located in the main body 10 and an outputting space 142 through the main body 10. ach controlling chamber 141 has a through aperture 143 on a side connected to the containing chamber 15 chamber such that water is able to flow from the containing chamber 15 to the controlling chamber 141 and then exit from the outputting space 142. Each of the control valve set 20 has a control valve 21 with a knob 211. The knob 211 has an extending valve tube 212 configured to sleeve onto the controlling chamber 141 of the controlling portion 14, and the knob 211 is exposed from the main body 10. Each valve tube 212 further has a through hole 213 capable of being aligned with the through aperture 143 with rotation of the control valve 21 such that each control valve set 20 is capable of controlling water flow.

Figure 3:
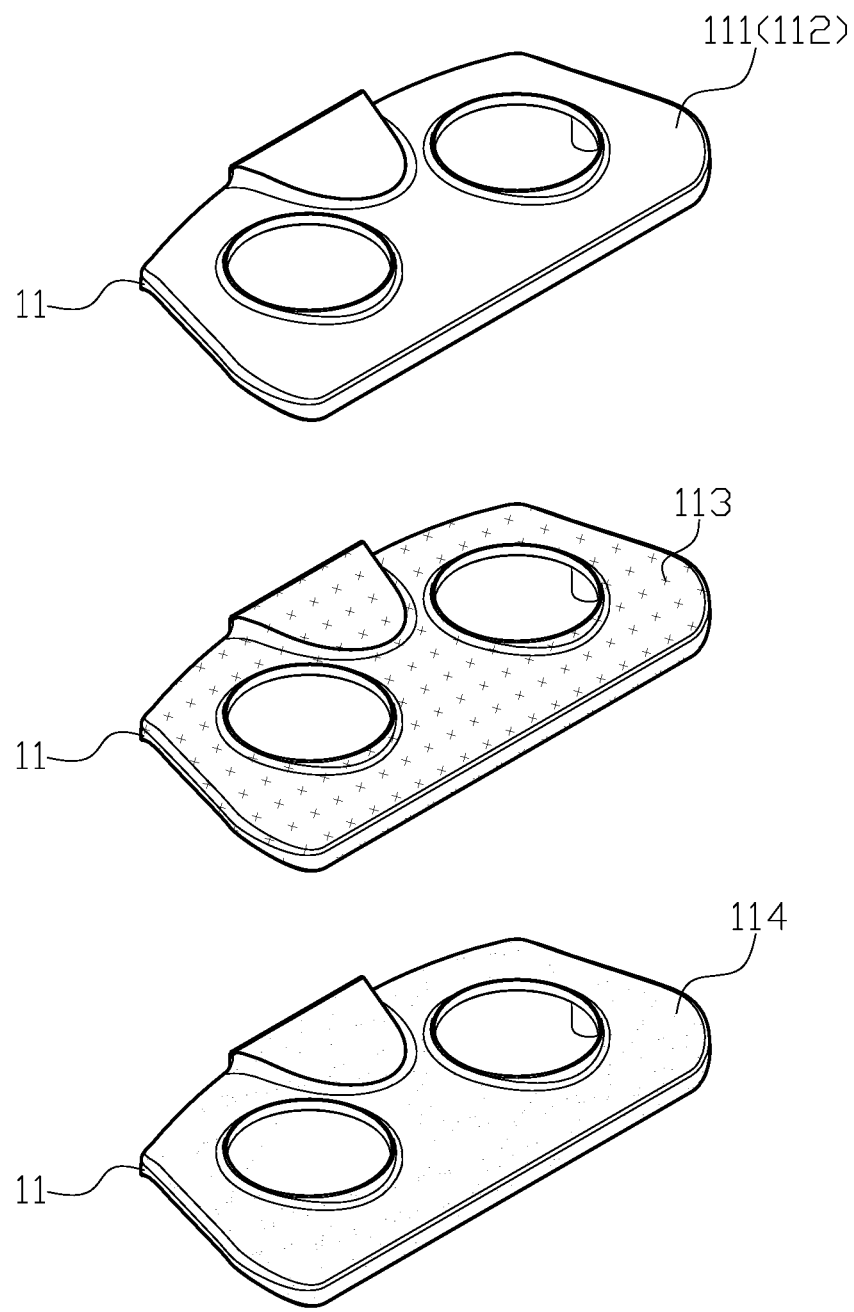
FIG. 3 is a state diagram of the upper cover selected for installation according to the preferred embodiment of the present invention.
Figure 4:
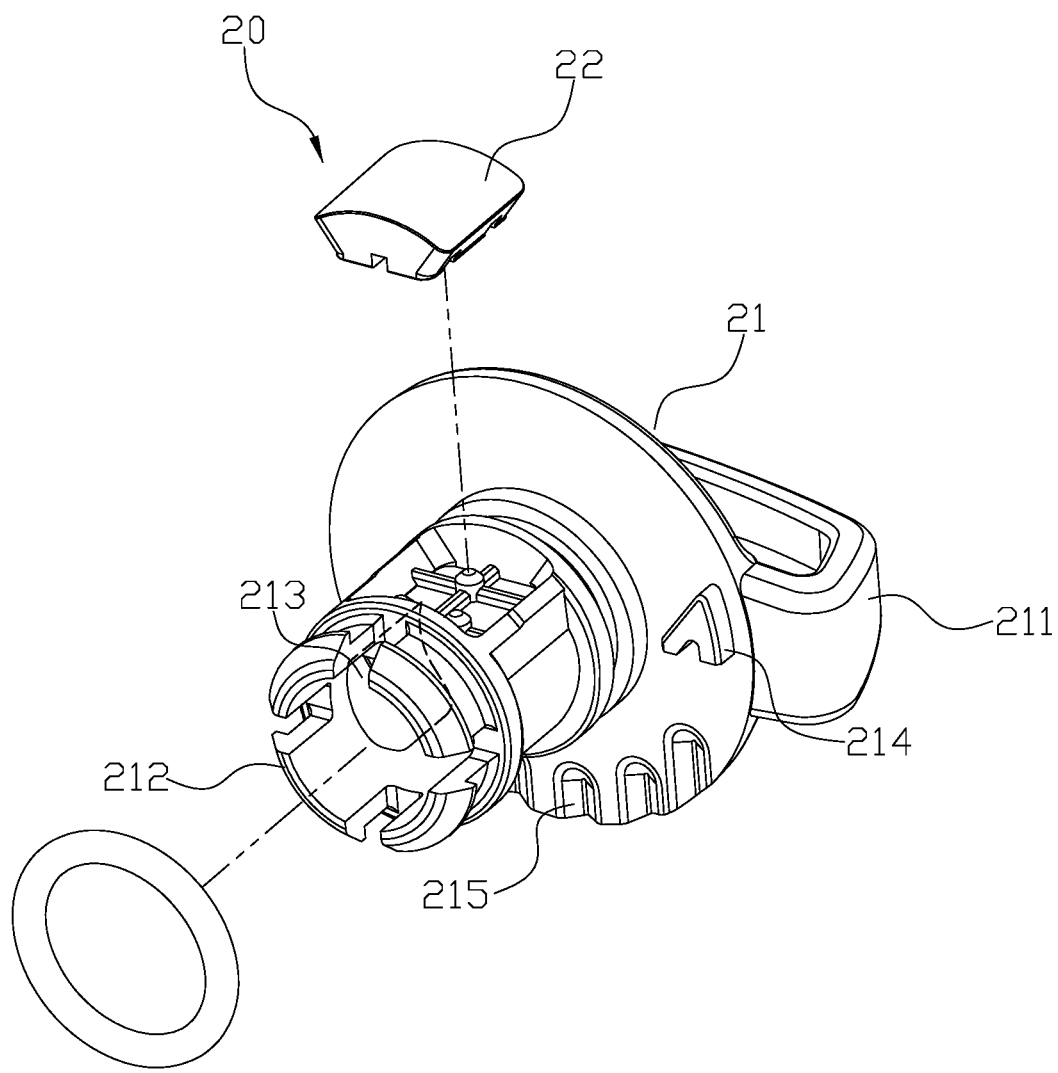
FIG. 4 is a detailed exploded view of the control valve set according to the preferred embodiment of the present invention.
Figure 5:
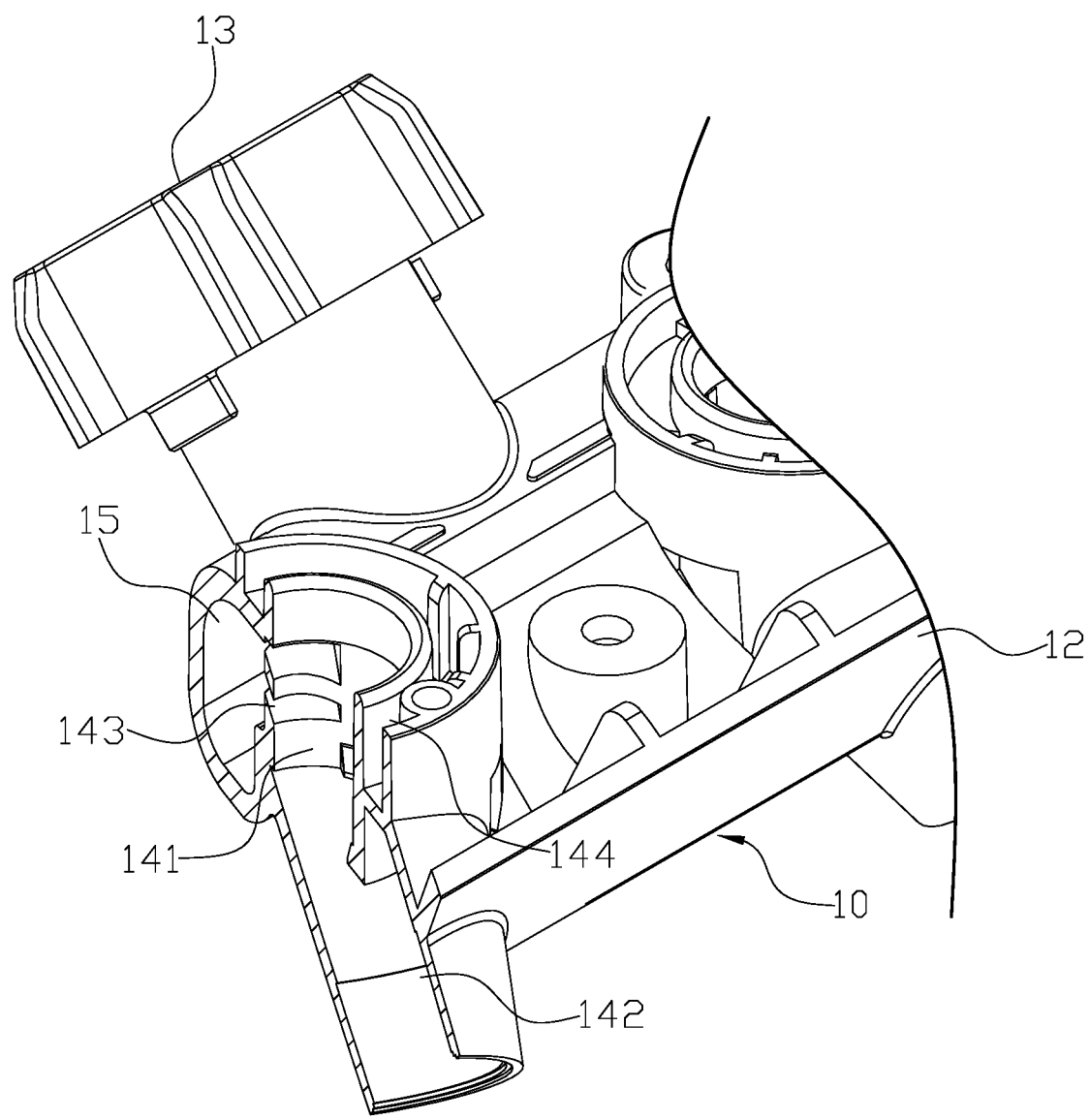
FIG. 5 is a cross-sectional view of the main body according to the preferred embodiment of the present invention.
Figure 6:
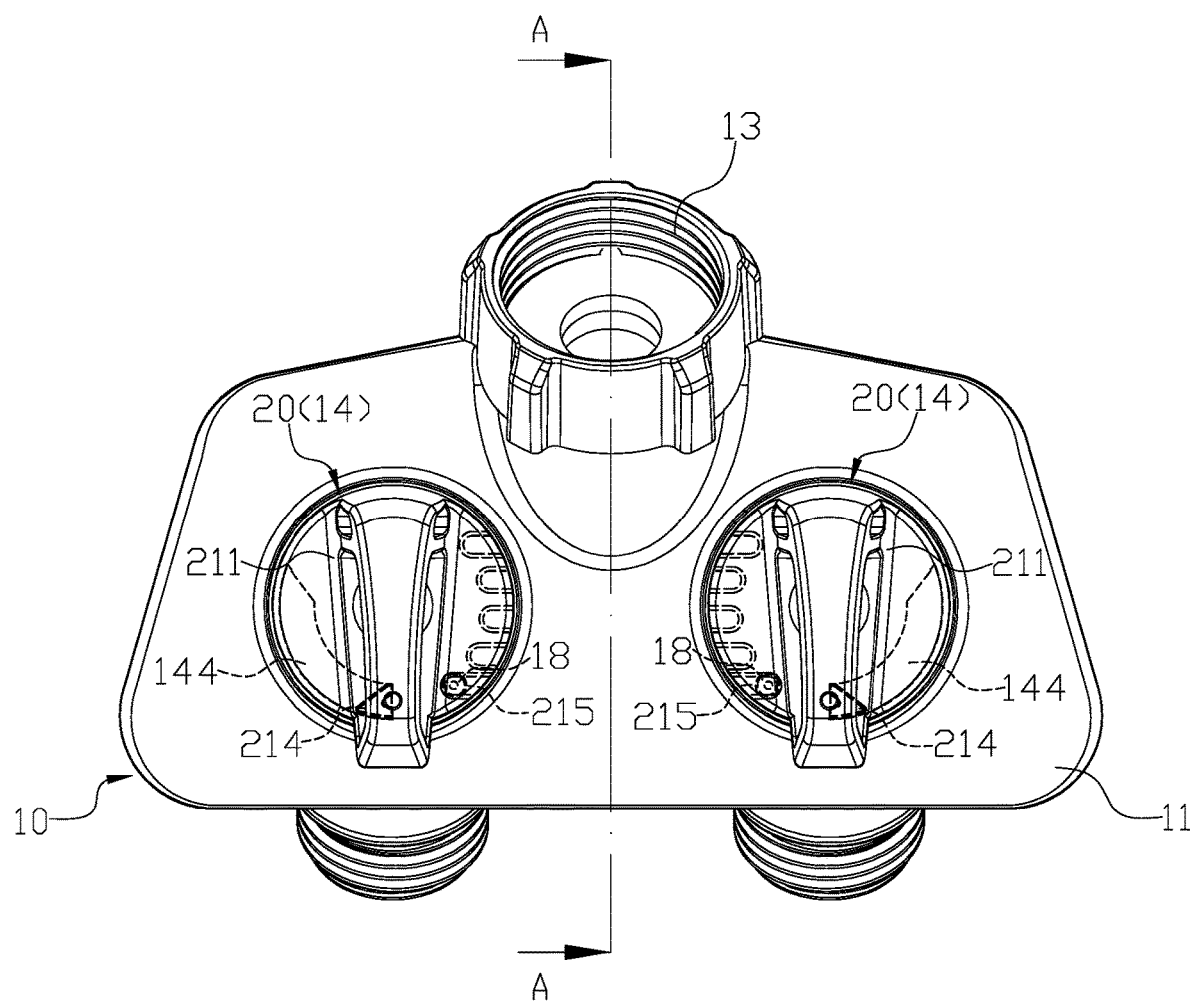
FIG. 6 is a combined plan of the preferred embodiment of the present invention.

As shown in FIG. 3, the upper cover 11 is made of metal 111.

As shown in FIG. 3, the upper cover 1111 is made of plastic 112.

As shown in FIG. 3, the upper cover 11 has various patterns 113.

As shown in FIG. 3, the upper cover 11 has different colors 114.

Furthermore, the input portion 13 is connected to a water source via at least one water pipe.

Moreover, the outputting space 142 space further comprises a joint 16 for connection.

Also, the joint 16 a threaded joint 161.

Alternatively, the joint 16 is a quick disconnect joint 162.

In addition, the joint 16 is adhered in the outputting space 142 by high frequency bonding.

Correspondingly, each controlling portion 14 has a rotary channel 144 and a positioning pin 18 pushed by a spring 17, and each knob 211 further has a positioning protrusion 215 and a plurality of engaging slots 215 on a side of the valve tube 212. The rotary channel 144 accepts the positioning protrusion 214 such that the control valve 21 is only able to have limited rotation on the controlling portion 14, and the positioning pin 18 is capable of engaging with the engaging slot 215 during the rotation.

Additionally, the valve tube 212 has a sealing washer 22, and the sealing washer 22 is disposed adjacent to the through hole 213. When the control valve 21 is rotated, the through hole 213 is capable of being aligned with the through aperture 143 such that each control valve set 20 is capable of controlling water flow.

Furthermore, the valve tube 212 further has claws for engaging in the controlling chamber 141.

Also, the valve tube 212 has at least one sealing washer.

Furthermore, the control valve 21 is capable of being rotated 90°.

Alternatively, the main body 10 has two control valve sets 20, as shown in FIGS. 1-10.

Figure 11:
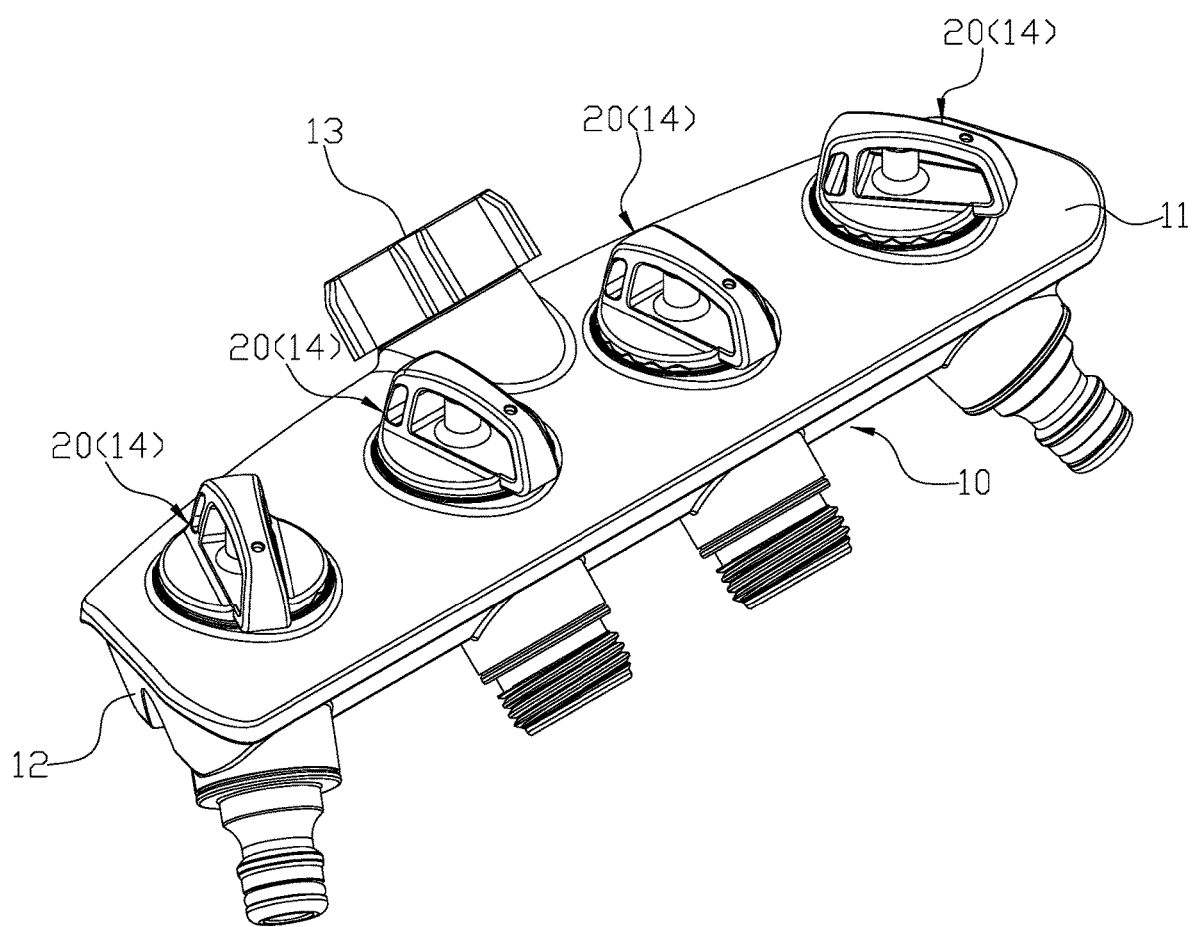
FIG. 11 is another preferred embodiment of the present invention.

Alternatively, the main body 10 has more than two control valve sets 20, as shown in FIG. 11.

Figure 7:
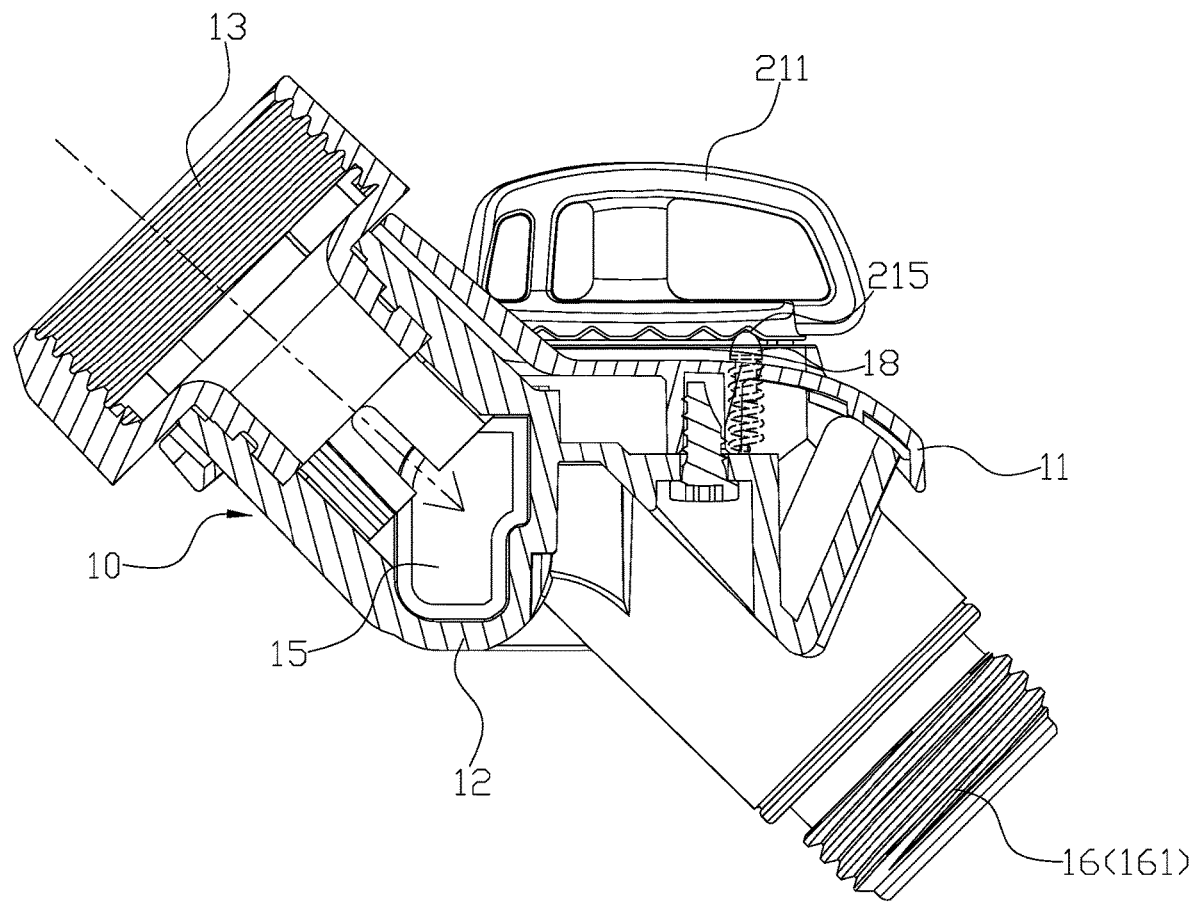
FIG. 7 is a state diagram of the water source being fed into the main body according to the preferred embodiment of the present invention.
Figure 8:
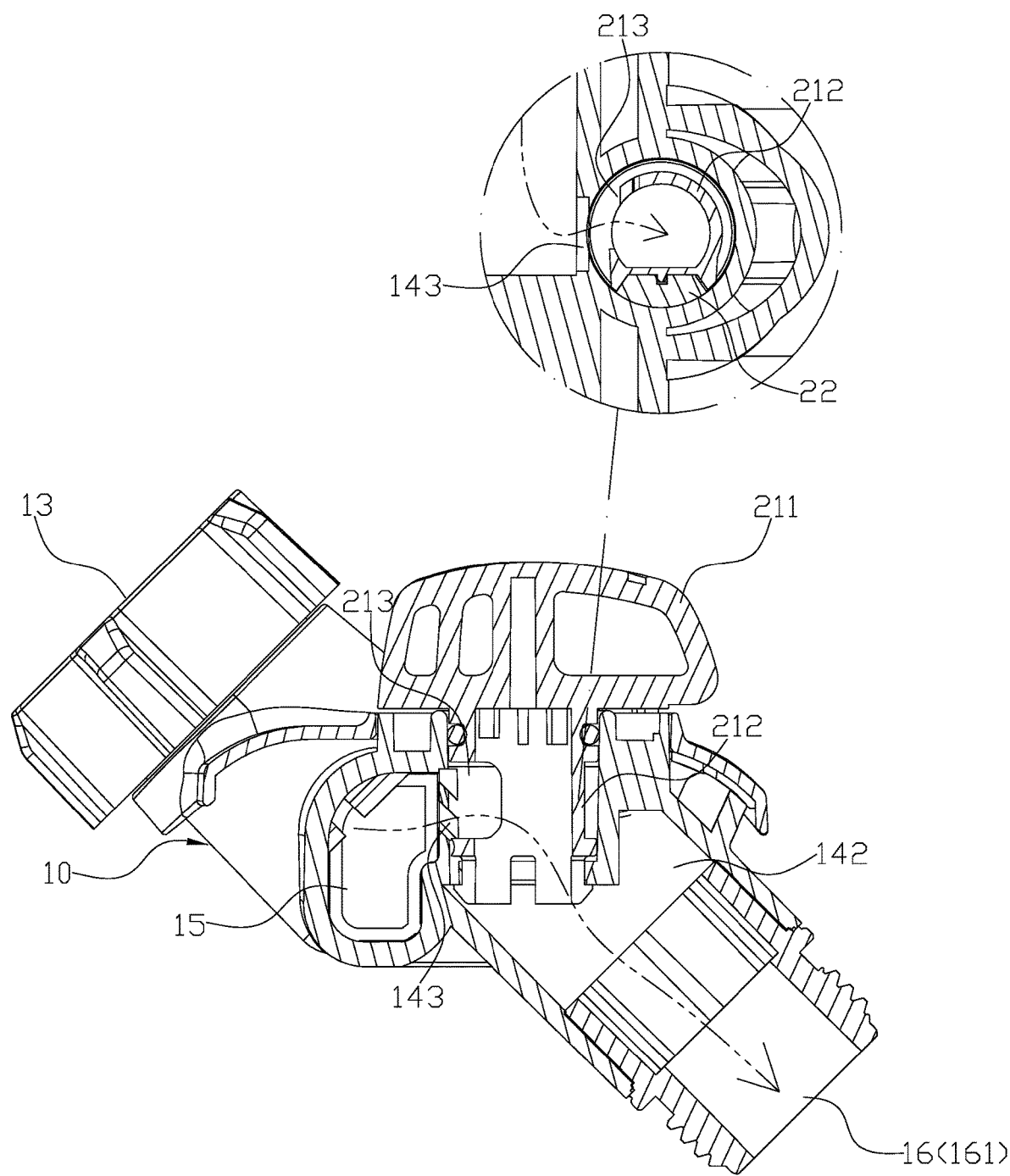
FIG. 8 shows a water outlet according to the preferred embodiment of the present invention.
Figure 9:
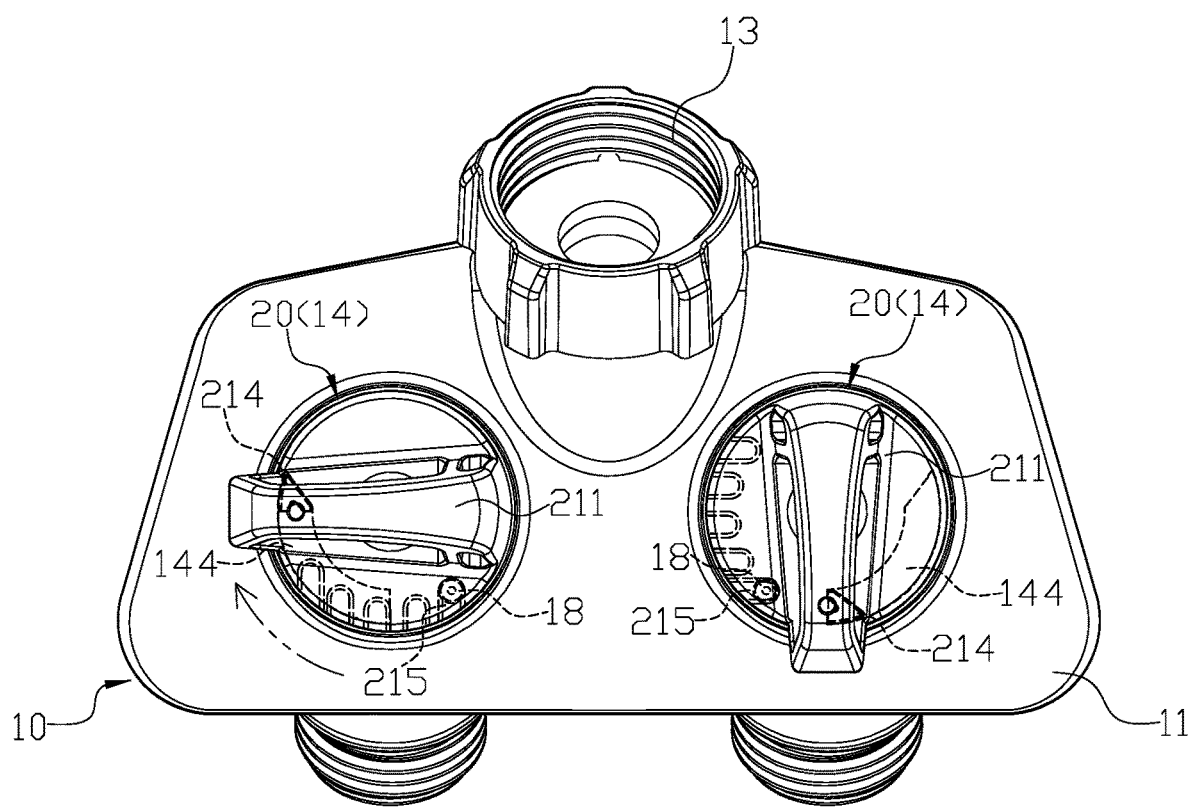
FIG. 9 shows rotation state of the control valve according to the preferred embodiment of the present invention.
Figure 10:
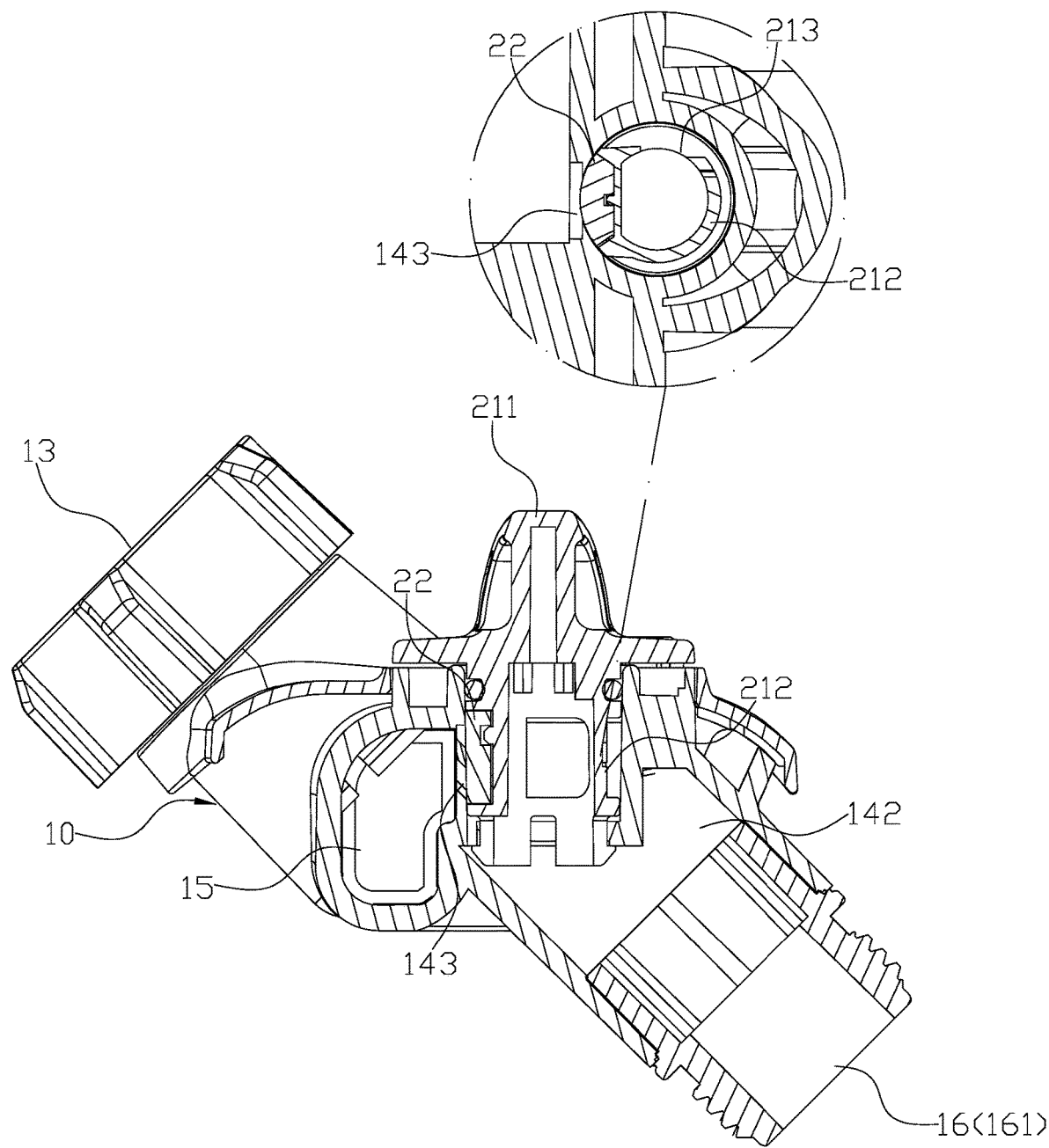
FIG. 10 shows the water being turned off according to the preferred embodiment of the present invention.

In actual use, the control valve 21 is rotated in one direction to make the through hole 213 to remain align with the through aperture 143, so that the water source sent from the input portion 13 into the containing chamber 15, as shown in FIG. 7, and then flow out from the valve tube 212, the outputting space 142 through the joint 16, as shown in FIG. 8. When the control valve 21 is being continuously rotated in the same direction, as shown in FIG. 9, the through aperture 143 is covered partially by the sealing washer 22, which can be used to control the flow rate of the water, and even turn off the entire water supply, as shown in FIG. 10. In other words, users can directly open and close the water on the water valve or control the flow rate of the water without running all the way to the water source, and each the control valve set 20 of the main body is designed independently of each other and can also be used as a water controller for garden sprinklers.

With the structure of the above-mentioned specific embodiment, the following benefits can be obtained: the upper cover 11 can be designed with different materials, patterns or colors depending on the consumer's own preferences, and the upper cover 11 can be replaced or customized; the garden control valve structure can be One-to-many connection is provided, so when multiple gardening water spraying tools are needed in the same field, only one water pipe needs to be pulled out from the water source and connected to the input portion 13 of the main body 10, The gardening control valve structure can be used to supply water to multiple gardening water spraying tools at the same time, which can be more simplified in use can also avoid the confusion of pipeline configuration. The control valve set 20 on the three main bodies 10 are opened independently of each other, which can control the water of the gardening water spraying tools connected to it separately, so that the user can turn on and off the water directly on the water valve or control the water flow without running all the way to the water source.

Although the present invention has been explained in relation to its preferred embodiment, it is to be understood that many other possible modifications and variations can be made without departing from the spirit and scope of invention as hereinafter claimed.

What is claimed is:

1. A water valve comprising: a main body and at least two control valve sets, wherein:
the main body has an upper cover and a base, the upper cover and the base correspondingly form an enclosed space and are locked with screws; the main body further has an input portion, at least two controlling portions and a containing chamber; the input portion is configured for connection to a water source, each controlling portion has a controlling chamber located in the main body and an outputting space through the main body; each controlling chamber has a through aperture on a side connected to the containing chamber such that water is able to flow from the containing chamber to the controlling chamber and then exit from the outputting space;
each of the control valve sets has a control valve with a knob, the knob has an extending valve tube configured to sleeve onto the controlling chamber of the controlling portion, and the knob is exposed from the main body; each valve tube further has a through hole capable of being aligned with the through aperture with rotation of the control valve such that each control valve set is capable of controlling water flow.

2. The water valve as claimed in claim 1, wherein the outputting space further comprises a joint.

3. The water valve as claimed in claim 2, wherein the joint is a threaded joint.

4. The water valve as claimed in claim 1, wherein the joint is a quick disconnect joint.

5. The water valve as claimed in claim 1, wherein the joint is adhered in the outputting space by high frequency bonding.

6. The water valve as claimed in claim 1, wherein each controlling portion has a rotary channel and a positioning pin pushed by a spring; each knob further has a positioning protrusion and a plurality of engaging slots on a side of the valve tube.

7. The water valve as claimed in claim 1, wherein each valve tube has a sealing washer, and the sealing washer is disposed adjacent to the through hole.

8. The water valve as claimed in claim 1, wherein an end of each valve tube further has claws for engaging in the controlling chamber.

9. The water valve as claimed in claim 1, wherein the main body has two control valve sets.

10. The water valve as claimed in claim 1, wherein the main body has more than two control valve sets.

* * * * *